United States Patent
Jiang et al.

(10) Patent No.: US 12,307,628 B2
(45) Date of Patent: May 20, 2025

(54) SYSTEM AND METHOD FOR IMAGE TRANSFORMATION

(71) Applicant: Shiseido Company, Limited, Tokyo (JP)

(72) Inventors: Shuhui Jiang, Cambridge, MA (US); Aneesh Bhat, Cambridge, MA (US); Kai Ho Edgar Cheung, Malden, MA (US); Yun Fu, Brookline, MA (US)

(73) Assignee: Shiseido Company, Limited, Tokyo (JP)

( * ) Notice: Subject to any disclaimer, the term of this patent is extended or adjusted under 35 U.S.C. 154(b) by 127 days.

(21) Appl. No.: 18/082,328

(22) Filed: Dec. 15, 2022

(65) Prior Publication Data

US 2023/0110393 A1   Apr. 13, 2023

Related U.S. Application Data

(63) Continuation of application No. PCT/IB2021/055768, filed on Jun. 28, 2021.
(Continued)

(51) Int. Cl.
*G06T 3/4046* (2024.01)
*G06T 5/40* (2006.01)
(Continued)

(52) U.S. Cl.
CPC ............. *G06T 3/4046* (2013.01); *G06T 5/40* (2013.01); *G06T 5/70* (2024.01); *G06T 11/001* (2013.01);
(Continued)

(58) Field of Classification Search
CPC .......... G06T 3/4046; G06T 5/40; G06T 5/70; G06T 11/001; G06T 2200/24;
(Continued)

(56) References Cited

U.S. PATENT DOCUMENTS 9,367,763 B1 *  6/2016  Gordo Soldevila ... G06V 20/62
2004/0008885 A1 *  1/2004  Caldato .................... H04N 1/60
                                                    382/166
(Continued)

FOREIGN PATENT DOCUMENTS

WO       2017203262 A2    11/2017

OTHER PUBLICATIONS

International Preliminary Report on Patentability for related International Patent Application No. PCT/IB2021/055768 dated Dec. 13, 2022, 7 Pages.
(Continued)

*Primary Examiner* — Prabodh M Dharia
(74) *Attorney, Agent, or Firm* — Morgan, Lewis & Bockius LLP

(57) ABSTRACT

A method for image transformation including receiving, from an electronic device, an input image having represented therein an object having a predefined region with a selected characteristic, extracting, from the input image, an isolated image corresponding to the predefined region, inputting the isolated image into a baseline generator, trained by an offline unbalanced neural network, that generates a new image that represents a modification to the predefined region in which the selected characteristic is replaced with a baseline characteristic, and generating an output image that reflects a modification of the input image to include a representation of the new image.

23 Claims, 8 Drawing Sheets

Related U.S. Application Data

(60) Provisional application No. 63/047,335, filed on Jul. 2, 2020.

(51) Int. Cl.
    *G06T 5/70* (2024.01)
    *G06T 11/00* (2006.01)

(52) U.S. Cl.
    CPC ............. *G06T 2200/24* (2013.01); *G06T 2207/10016* (2013.01); *G06T 2207/10024* (2013.01); *G06T 2207/20081* (2013.01); *G06T 2207/20084* (2013.01); *G06T 2207/30201* (2013.01)

(58) Field of Classification Search
    CPC . G06T 2207/10016; G06T 2207/10024; G06T 2207/20081; G06T 2207/20084; G06T 2207/30201
    USPC ............................................ 345/601; 702/61
    See application file for complete search history.

(56) References Cited

U.S. PATENT DOCUMENTS

| | | | |
|---|---|---|---|
| 2007/0143045 A1* | 6/2007 | MacGregor | G06Q 50/06 702/61 |
| 2018/0315188 A1* | 11/2018 | Tegzes | G06T 7/11 |
| 2019/0130221 A1* | 5/2019 | Bose | G06N 3/045 |
| 2020/0160153 A1* | 5/2020 | Elmoznino | G06T 19/006 |
| 2020/0320769 A1* | 10/2020 | Chen | G06F 18/214 |
| 2020/0327309 A1* | 10/2020 | Cheng | G06N 3/084 |

OTHER PUBLICATIONS

International Search Report and Written Opinion issued in corresponding International Patent Application No. PCT/IB2021/055768, dated Sep. 23, 2021, 5 pages.

* cited by examiner

SYSTEM AND METHOD FOR IMAGE TRANSFORMATION

CROSS-REFERENCE OF RELATED APPLICATIONS

This application is a continuation of International Patent Application No. PCT/IB2021/055768, filed Jun. 28, 2021, which claims the benefit of U.S. Provisional Patent Application No. 63/047,335 filed Jul. 2, 2020 entitled "System and Method for Image Transformation", each of which is incorporated by reference herein in its entirety.

FIELD OF THE INVENTION

The field of the invention relates generally to transformation of images and, more specifically, video images, including virtually removing makeup from an image of a human face.

SUMMARY OF THE INVENTION

One embodiment of the present invention is directed to a method for image transformation, including the following steps: receiving, from an electronic device, an input image having represented therein an object having a predefined region with a selected characteristic; extracting, from the input image, an isolated image corresponding to the predefined region; inputting the isolated image into a baseline generator, trained by an offline unbalanced neural network, that generates a new image that represents a modification to the predefined region in which the selected characteristic is replaced with a baseline characteristic; and generating an output image that reflects a modification of the input image to include a representation of the new image. An exemplary embodiment of this method is illustrated with reference to FIG. 1.

In some embodiments, the predefined region is an anatomical region of a user, which may be a lip region.

In some embodiments, the selected characteristic is an appearance of make-up and the baseline characteristic is an appearance without make-up.

In some embodiments, extracting the isolated image includes extracting a sub-region from the predefined region. For example, the pre-defined region includes an image representing a mouth and the sub-region extracted from the pre-defined region includes an image representing lips of the mouth.

In some embodiments, the input image is different than the output image. In some embodiments, the input image may be a real image. For example, a real image may be an actual image taken by an end user, a source image that is un-edited or an initial image that substantially represents the subject of the image as that subject appeared at the time the image is capture. The output image may be an artificially generated image such as an image generated by the neural network.

In some embodiments, the input image is a single frame from a plurality of frames, the plurality of frames forming a video.

In some embodiments, the method further includes transmitting the output image to a user interface associated with the electronic device. For example, the output image may be transmitted to the user interface of the electronic device such that the electronic device displays the output image to the user.

In some embodiments, the method further includes determining whether the input image is an initial image of a plurality of images. In some embodiments, the method includes distinguishing images taken as still images from images taken as video images.

In some embodiments, the method further includes applying memory-based histogram matching based on the determination that the input image is not the initial image of the plurality of images. In certain of these embodiments, the method further includes applying non-memory based histogram matching based on the determination that the input image is the initial image of the plurality of images. In some embodiments, generating the output image includes performing non-memory based histogram matching and/or memory-based histogram matching. For example, if the input image is the initial image of a plurality of images, such as a video, memory-based histogram matching may be applied to the input image. However, if the input image is not the initial image of a plurality of images, then non-memory based histogram matching may be applied to the input image. Input image may be a single image out of a plurality of images, such as a video, and histogram matching may be applied to input image to ensure that input image resembles the other images in the plurality of images.

Another embodiment of the present invention is directed to a method for training a neural network for image transformation, including the following steps: receiving an input image including a predefined region, the predefined region having a baseline characteristic; generating, using a generator, a modified image based on the input image, the modified image having a selected characteristic that is different than the baseline characteristic; reducing a resolution of the modified image to produce a reduced resolution image; generating, using a baseline generator and based on the reduced resolution image, a generated image having the baseline characteristic; constructing a loss function based upon a comparison of the generated image and the input image; and optimizing the loss function by applying the loss function to the baseline generator to generate at least one subsequent image if the loss function exceeds a desired optimization. An exemplary embodiment of this method is illustrated in the forward cycle portion in FIG. 2A.

In some embodiments, the generator is a make-up generator that generates an image comprising a subject wearing make-up (e.g., generated from an image in which the subject is not wearing make-up) and the baseline generator includes a make-up remover that generates an image comprising a subject that is not wearing make-up (e.g., from an image with the subject wearing makeup).

In some embodiments, the selected characteristic includes an appearance of make-up and the baseline characteristic includes an appearance without make-up.

In some embodiments, the generated image having the baseline characteristic is not identical to the input image having the baseline characteristic. In some embodiments, the generated image and the input image look substantially similar, but are not identical. For example, both the generated image and the input image may have a baseline characteristic such as a mouth or other facial feature. In some embodiments, the baseline characteristic may belong to a different image subject. For example, images of two different people with a different mouth shape.

In some embodiments, the modified image does not include the baseline characteristic. For example, the modified image may include only the selected characteristic without including the baseline characteristic. For example, a baseline characteristic may include a mouth having no make-up, make-up removed, or other facial characteristic. The modified image may include the mouth having make-up.

In some embodiments, reducing the resolution of the modified image comprises down sampling of the modified image to generate a reduced modified image and resizing of the reduced modified image to a size of the modified image. In some embodiments, the resolution and the size of the image is measured in megapixels. In some embodiments, the file size of the image is measured in megabytes.

In some embodiments, a resolution of the generated image is greater than a resolution of the reduced modified image.

In some embodiments, the input image is a real image and the modified image and the generated image are artificially generated images that are, for example, generated using then neural network.

In some embodiments, the method further includes determining, using a baseline discriminator associated with the baseline generator, whether the generated image is a real image with the baseline characteristic or an artificial image with the baseline characteristic.

In some embodiments, the method further includes determining, using a discriminator associated with the selected generator, whether the modified image is a real image with the selected characteristic or an artificial image with the selected characteristic. For example, a discriminator may be used to determine whether modified image is an artificial image generated by the neural network or a real image inputted into the neural network. In some embodiments, the modified image with the selected characteristic is an image having a make-up on the mouth or other facial characteristics.

In some embodiments, the loss function is a consistency loss function, a noise function, or combination thereof.

In some embodiments, the method further includes: receiving a second input image including a second predefined region, the second predefined region having the selected characteristic; generating, using the baseline generator, a second generated image based on the second input image; generating, using the generator, a second modified image based on the second generated image; constructing a second loss function based upon a comparison of the second modified image and the second input image; and optimizing the second loss function by applying the second loss function to the baseline generator to generate at least one subsequent image if the loss function exceeds a desired optimization. For example, the second input image may include a second predefined region, such as a mouth or other facial characteristic. In some embodiments, the input image and the second input image may further used to train the neural network. For example, the input image may include a facial characteristic, such as a mouth having an appearance of no make-up, and the second input image may include a facial characteristic, such as a mouth having an appearance of make-up.

Such an embodiment may include the following further steps: adding noise to the second input image to generate a noise image; generating, using the baseline generator, a generated noise image based on the noise image, the generated noise image and the second generated image having the baseline characteristic; constructing a noise function based on a comparison of the generated noise image and the second generated image; and updating the second loss function associated with the baseline generator with the noise function. This embodiment may further include reducing a resolution of the second input image to produce a second reduced resolution image and/or reducing a resolution of the noise image to produce a reduced noise image. An example of this embodiment is illustrated in FIG. 2B.

In some embodiments, the invention includes a method for training a neural network for image transformation. The method includes receiving an input image including a predefined region, the predefined region having a selected characteristic; reducing a resolution of the input image to produce a reduced resolution image; generating, using a baseline generator, a generated image based on the reduced resolution image, the generated image having a baseline characteristic that is different than the selected characteristic; generating, using a generator and based on the generated image, a modified image having the selected characteristic; constructing a loss function based upon a comparison of the modified image and the input image; and optimizing the loss function by applying the consistency loss function to the generator to generate at least one subsequent image if the consistency loss exceeds a desired optimization. An example of this method is illustrated in FIG. 2A.

Another embodiment of the present invention is directed to a method for training a neural network for image transformation, which includes the following steps: receiving an input image including a predefined region, the predefined region having a selected characteristic; generating, using the baseline generator, a generated image based on the input image; adding noise to the input image to generate a noise image; generating, using the baseline generator, a generated noise image based on the noise image, the generated noise image and the generated image having a baseline characteristic, wherein the baseline characteristic is different than the selected characteristic; constructing a noise function based on a comparison of the generated noise image and the generated image; updating a loss function associated with the baseline generator with the noise function; and optimizing the loss function associated with the baseline generator by applying the loss function to the baseline generator to generate at least one subsequent generated image if the loss function exceeds a desired optimization. In some embodiments, adding noise includes adding noise to one or more pixels of the input image. The first characteristic may be an appearance of make-up and the second characteristic may be an appearance without make-up. An example of this method is illustrated in FIGS. 2A and 2B.

Another embodiment of the invention is directed to a system that includes an unbalanced neural network. The unbalanced neural network may include system components, which may be embodied in a hardware and software configuration. The system components of the unbalanced neural network may include the following: a baseline generator associated with a baseline characteristic, the baseline generator configured to generate an image having the baseline characteristic; a generator associated with a selected characteristic, the generator configured to generate an image having the selected characteristic; a baseline discriminator associated with the baseline generator; and a discriminator associated with the generator. Compared to the generator, the baseline discriminator, and the discriminator, the baseline generator includes at least one of a smaller number of res-blocks, a smaller number of filters, and a smaller filter size. An example of such configuration of an unbalanced neural network is described with reference to FIG. 7

An exemplary architecture of the baseline generator is illustrated with reference to FIG. 3. An exemplary architecture of the generator is illustrated with reference to FIG. 5. An exemplary architecture of the discriminator is illustrated with reference to FIG. 6.

In some embodiments, the baseline generator includes up to four res-blocks and the generator includes more than four res-blocks.

In some embodiments, the baseline generator is configured to produce a result in real-time/near real time and configured to process at least 30 frames per second and may run on a CPU or GPU.

In some embodiments, the input image received by the baseline generator has a resolution lower than input image received by the generator.

In some embodiments, an input image and an output image associated with the baseline generator are at least four times smaller than an input image and an output image associated with each one of the generator, the baseline discriminator, and the discriminator.

A further aspect of the present invention is directed to a method for processing a video. The method includes: receiving an input image with a selected characteristic, wherein the input image is selected from a plurality of images forming a video; generating, using a baseline generator and based on the input image, a generated image having a baseline characteristic different than the selected characteristic, wherein the input image and the generated image are in an RGB color space; converting the input image from the RGB color space to a CIELAB color space to generate a histogram of an input lightness channel associated with the input image in the CIELAB color space; converting the generated image from the RGB color space to the CIELAB color space to generate a histogram of a generated lightness channel associated with the generated image in the CIELAB color space, a generated first color channel, and a generated second color channel; determining if the input image represents an initial image of the plurality of images; if the input image represents the initial image of the plurality of images, learning a mapping function between the histogram of the generated lightness channel and the histogram of the input lightness channel to generate a histogram of a new lightness channel, and generating, based on the mapping function, a new image in the CIELAB color space associated with histogram of the new lightness channel, the generated first color channel, and the generated second color channel, wherein the new image has the baseline characteristic; if the input image does not represent the initial image of the plurality of images, learning a mapping function between a weighted sum of the histogram of the generated lightness channel and a histogram of a plurality of lightness channels associated with a plurality of previous images, which is an image subset of the plurality of images in the CIELAB color space occurring before the input image, to generate a weighted histogram of a new weighted lightness channel, and generating, based on the mapping function, a new image in the CIELAB color space associated with the new weighted lightness channel, the generated first color channel, and the generated second color channel, wherein the new image has the baseline characteristic; and converting the new image from CIELAB color space to RGB color space to generate an output image.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings, like reference characters generally refer to the same parts throughout the different views. Further, the drawings are not necessarily to scale, with emphasis instead generally being placed upon illustrating the principles of the invention.

In the drawings.

DETAILED DESCRIPTION OF THE INVENTION

Figure 1:
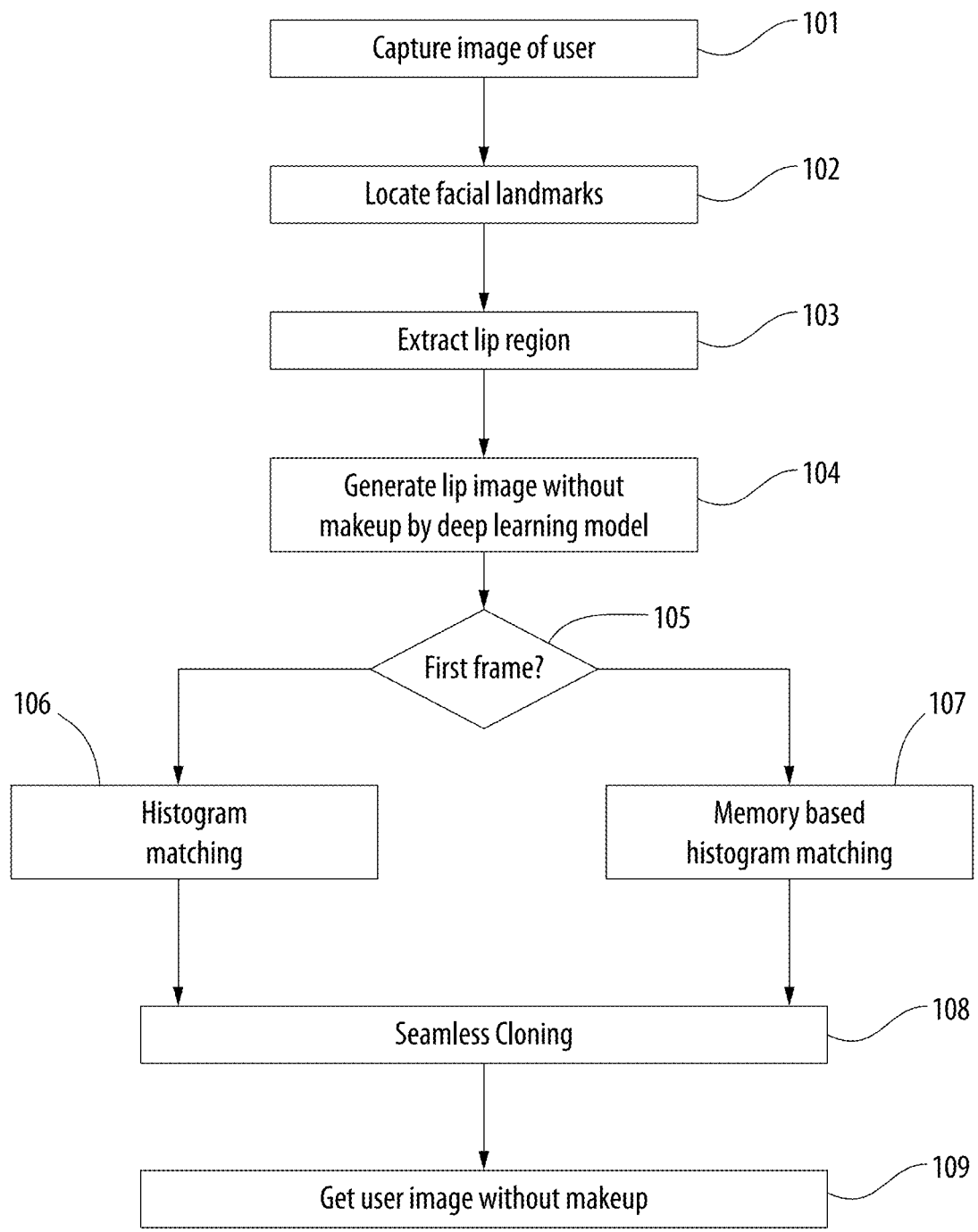
FIG. 1 is a flow diagram illustrating an exemplary methodology for transforming an image according to one embodiment.

The following provides a description of exemplary embodiments of the present invention. The present invention is directed to an image transformation system and method. Aspects of the present invention are described herein with reference to exemplary embodiments involving removal of specific features from images of a human face, such as make-up, face paint, or tattoos. In some embodiment, the present invention is directed towards removal of makeup from the lip region of a human face. However, at least certain aspects of the invention are not so limited and are more broadly applicable to transformation of images, including video images, in a variety of respects. Specific embodiments described herein relating to makeup removal, and more particularly removal of makeup from the lip region, are exemplary only and not limiting.

In an exemplary embodiment, the system and method involve transformation of a plurality of images, such as video images, in real-time or near real-time using a deep learning system. In some embodiments, the video images have a lack of consistency among video frames (e.g., lighting and/or color) and low resolution quality of input images. The exemplary embodiment involves the use of a lightweight engine running on a CPU or GPU to allow for the real-time or near real-time processing of images. For example, the exemplary embodiment may allow for transformation of each of the plurality of images as the plurality of images are being received. Further the lightweight engine allows for the transformation of video images on-line (e.g., over the Internet) or via the cloud (e.g., remote servers). Training of the engine may be performed off-line with full sized models, described more fully herein, to achieve the desired quality of the output images.

An overview of an exemplary system of the present invention is now described. The present overview describes a specific embodiment of a system that removes desired features (e.g., makeup) from an image, such as a human face. The exemplary system may include on-line operation and an off-line training system. The off-line training system may include a makeup generator, a makeup removal generator, and makeup removal discriminators. In some embodiments, the on-line operation involves the makeup removal generator. The off-line system trains the makeup removal generator to enable it to remove makeup from an image, accounting for inconsistency among video frames and insufficient image quality. As noted previously, in some embodiments, the on-line makeup removal generator is lightweight (as compared to the off-line training system) and operates in real-time or near real-time speed during the on-line operation to process the video images frame-by-frame. In an exemplary embodiment, the training framework of the inventive system is a variant of CycleGAN. For example, the training framework of the inventive system may be a variant of the CycleGAN methodology disclosed in "Unpaired image-to-image translation using cycle-consistent adversarial networks" to Zhu et al hereby incorporated by reference in its entirety. In some embodiments, when optimizing the makeup removal generator, the system accounts for inconsistency among video frames and super-resolution technology to account for low quality input images. The system may utilize a pop-loss function to correct the inconsistencies among video frames. A pop-loss function may be incorporated to minimize the differences between two images by adding random noise onto the original input image to train the system as described in further detail below. For example, pop-loss may be used to account for inconsistencies among video frames.

FIG. 1 is a flow diagram illustrating a high-level exemplary methodology for transforming an image according to some embodiments. More particularly, FIG. 1 illustrates an exemplary methodology for removing makeup from an image of a human face. In some embodiments, the exemplary method is not limited to removing makeup from an image of a human face. In some embodiments, the exemplary methodology may be used to remove any features from an image of a human face. For example, the exemplary methodology may be used to remove face paint or tattoos from an image of a human face. The input may be a frame of the user's image with a particular features (e.g., makeup), and the output may be a frame of the user's image without the particular feature.

In step 101, the input image is captured (referred to herein as input image data). For embodiments involving video images, the user's image is processed frame-by-frame in real time (e.g., during the receipt of subsequent frames of the video). In step 102, facial landmarks are detected and, in step 103, a region of interest (e.g., a lip region image) is cropped (referred to herein as isolated image data) based on the facial landmarks. In step 104, the isolated image data (e.g., lip region image with makeup) is fed into a deep learning model (e.g., which has been trained off-line) to generate an new image data representing the image region without makeup.

In an exemplary embodiment, the system includes a deep learning framework that is an end-to-end feed-forward neural network that has been trained off-line in accordance with the processes described elsewhere herein. Due to the feed-forward architecture of the framework, in the on-line operation, only a forward step operation of image transformation needs to be run to generate a lip image without makeup, in some embodiments. In order to achieve real-time speed on the CPU/GPU in the on-line operation, a lightweight model structure is employed, as well as small input and output shapes of the model, instead of directly operating on large size images. Because this may cause a decrease of image quality, post-processing may be performed to improve the image quality.

In some embodiments, post-processing includes two steps. The first step is histogram matching and the second step is seamless cloning. When applied, the first step of histogram matching has two main purposes. The first purpose is to improve the image quality of the output of deep learning model, given the reduced size of the input image and network parameters for speed up. The second purpose is to reduce the differences between a series of frames in video-based generation. Those differences may include for example lighting and color distributions. If the current frame is the first frame of the video, histogram matching is conducted in the CIELAB color space, using the information of the first frame. If the current frame is not the first frame, memory-based histogram matching is conducted, which takes into account both the current frame and all the previous frames occurring prior to the current frame.

The second step of post-processing is to apply seamless cloning to put the lip region image back into the face image without artifacts on the boundary of the lip region. In some embodiments, only a sub-region (e.g., the actual lips) is cloned instead of the larger region (e.g., a larger rectangular section that includes the lip region and surrounding areas). One benefit of cloning only a sub-region is to product the appearance of a cleaner image. The appearance of a cleaner image can be attributed to the human eye sensitivity to artifacts at or near the boundary of curves a compared to the proximity of straight lines (e.g., the boundary of the rectangular section).

FIG. 1 is referred to again as it illustrates the post-processing steps. In step 105, it is determined whether the frame is the first frame of the video. If so, in step 106, histogram matching is performed. If the frame is not the first frame of the video, then in step 107, memory-based histogram matching is performed. The post-processing steps 106 and 107 are described in more detail elsewhere herein. In some embodiments, a further post-processing step 108 is performed, referred to as seamless cloning. In step 109, the final image including the lip region without makeup is generated (referred to herein as output image data). A detailed description of the post-processing steps is provided elsewhere herein.

The following provides exemplary pseudo code of the online makeup removal system.

```
Online virtual lip makeup removal
  input: source image I
  output: image O with no makeup on lip region
  while: capture image
    do face detection and landmark location on the input image I
```

```
if (face detected)
    Extract lip region with makeup y
    Feed y into deep learning model F(x) and get output lip without makeup by
x̂ = F(y)
    if (current frame is the first frame in the video)
        Conduct histogram matching towards x̂ and obtain $x^h$
    else
        Conduct memory-based histogram matching towards x̂ and obtain $x^h$
    endif
    Seamless clone the lip region $x^h$ to I and obtain image O
endif
```

The system may be trained using a deep learning model to transform an image with a certain feature (e.g., makeup) to an image without the certain feature (e.g., without makeup). Training of the deep learning model system is now described. The problem may be defined as follows. There is a set of lip images without makeup $X=\{x_1, \ldots, x_i, \ldots, x_m\}$, $x_i \sim P_X$ and a set of lip images with makeup $Y=\{y_1, \ldots, y_j, \ldots, y_n\}$, $y_i \sim P_Y$. The goal is to learn a function $F(\cdot)$, so that given a lip image with makeup $y_q$, a lip image with the same identity but without makeup is generated, using the function $\hat{x}_q = F(y_q)$.

Figure 2A:
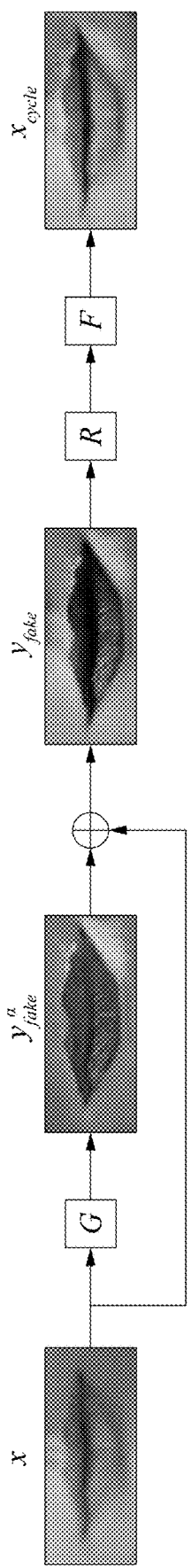
FIG. 2A is a diagram illustrating a forward cycle associated with a training framework for the image transformation system according to one embodiment.
Figure 2B:
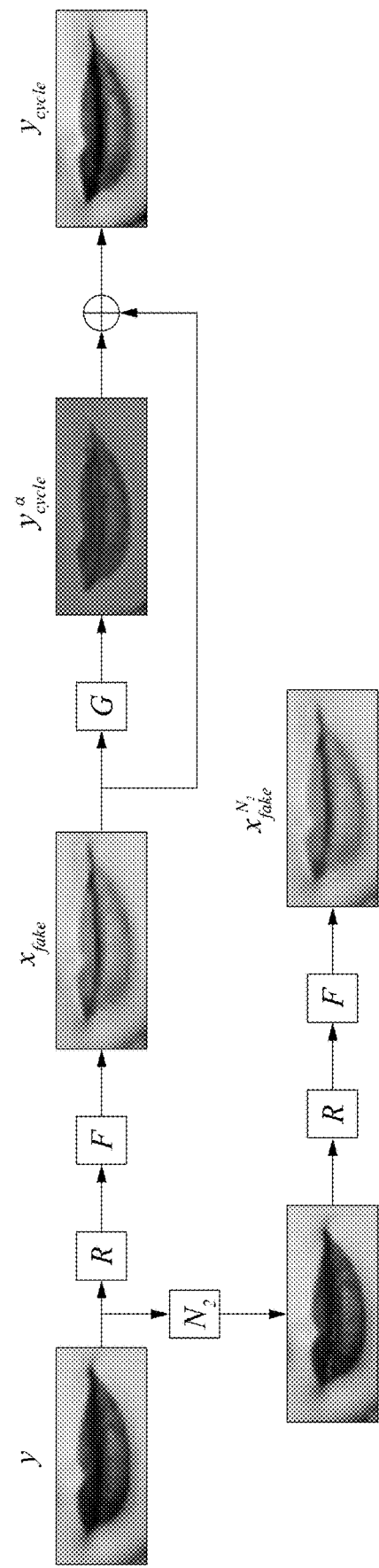
FIG. 2B is a diagram illustrating a backward cycle associated with a training framework for the image transformation system according to one embodiment.

With reference to FIGS. 2A and 2B, the off-line training framework of the lip region removal system is illustrated by way of a flow diagram. Given an image without makeup x and an image with makeup y, the training framework simultaneously learns a makeup generator G and a makeup removal generator F.

The upper part of the flow diagram is a forward cycle: $x \rightarrow G(x)+x+F(R(G(x)+x)) \approx x$ and the lower part is a backward cycle $y \rightarrow F(R(y)) \rightarrow G(F(R(y)))+F(R(y)) \approx y$.

The off-line training system includes a makeup removal generator F, a makeup generator G, a makeup removal discriminator $D_X$ and a makeup discriminator $D_Y$ (the discriminators not illustrated in FIGS. 2A and 2B).

A Generative Adversarial Network (GAN) may be applied for learning the generators F and G and discriminators $D_X$ and $D_Y$ simultaneously. Generally, a GAN is composed of two sub-networks called a generator and discriminator, pitched in competition against each other. The generators attempt to make the generated fake images look like a real image from the dataset, instead of a synthesized one, while the discriminators attempt to distinguish between fake images and real ones.

In one embodiment, to generate realistic fake images with makeup and without makeup, two cycles may be used, as illustrated in FIGS. 2A and 2B. The two cycles may include a forward cycle (FIG. 2A) and a backward cycle (FIG. 2B). Given a lip image without makeup x, lip makeup $y_{fake}^a$ is generated through $y_{fake}^a = G(x)$. Then, the makeup $y_{fake}^a$ is added to the input to x get the generated lip image with makeup as $y_{fake} = y_{fake}^a + x$. Then, the resolution of $y_{fake}$ is reduced through $R(y_{fake})$. Finally, the lip image without makeup is generated as $x_{cycle} = F(R(y_{fake}))$. In the forward cycle, the goal is to make the reconstructed $x_{cycle}$ and input x similar to keep the cycle consistency $y \rightarrow F(R(y)) \rightarrow G(F(R(y)))+F(R(y)) \approx y$. One purpose of adding the reduce resolution function $R(\cdot)$ before feeding the image into F is to allow the learned F function to have the ability to generate a high-resolution output from a low-resolution input, referred to herein as super-resolution.

Referring to the backward cycle, given a lip image with makeup y, first, the resolution of y is reduced through $R(y)$. Then, $R(y)$ is fed into removal network F to generate an image without makeup as $x_{fake}$. Then, the makeup $y_{cycle}^a = G(x_{fake})$ is generated and used to generate the lip image with makeup as $y_{cycle} = y_{cycle}^a + x_{fake}$. In the backward cycle, the goal is to make the reconstructed $y_{cycle}$ and input y similar to keep the cycle consistency $y \rightarrow F(R(y)) \rightarrow G(F(R(y)))+F(R(y)) \approx y$.

In some embodiments, a comparison is made of the removal image $x_{fake}$ and $x_{fake}^{N_2}$ generated with inputs without and with makeup, respectively. $x_{fake}^{N_2}$ is generated with noise input by adding random noise to input y through $N_2(\cdot)$. The goal is to make $x_{fake}$ and $x_{fake}^{N_2}$ similar so that the learned F has the ability to remove noise via de-noising.

The following describes the objective functions to optimize the generators F, G and discriminators $D_X$, $D_Y$. The networks are optimized through minimizing the loss functions, as described in the following.

In an exemplary embodiment, the loss function for Generator F includes one or more of three parts: GAN loss $L_{GAN}$, cycle consistency loss $L_C$ and pop loss $L_P$. In some embodiments, $\lambda$ may refer to a hyperparameter for adjusting the weight of each loss in the whole loss function for Generators F and G. In a preferred embodiment, the loss function for Generator F includes all three parts: $L_F(G, F, D_X, D_Y) = \lambda_1 L_{GAN}(F, D_X, Y, X) + \lambda_3 L_C(G, F) + \lambda_4 L_P(F)$.

In an exemplary embodiment, the loss function for Generator G includes one or more of three parts: GAN loss $L_{GAN}$, cycle consistency loss $L_C$ and makeup sparse loss $L_S$. In a preferred embodiment, the loss function for Generator F includes all three parts:

$$L_F(G, F, D_X, D_Y) = \lambda_2 L_{GAN}(F, D_Y, Y, X) + \lambda_3 L_C(G, F) + \lambda_5 L_S(G).$$

In some embodiments, the main purpose of GAN loss for a generator is to take into account that the generated fake image may be close enough to a real image that a discriminator may not be able to distinguish between the two. The discriminator may in such a circumstance, for example, assign a real image label "b" to the fake image. A least square distance is preferably applied to calculate the GAN loss, which is investigated in Least Square Generative Adversarial Network (LSGAN) as $$L_{GAN}(D_Y, X, G) = \mathbb{E}_{x \sim P_X}[\|D_Y(G(x)+x)-b\|_2],$$

$$L_{GAN}(D_X, Y, F) = \mathbb{E}_{y \sim P_Y}[\|D_X(F(R(y)))-b\|_2].$$

In some embodiments, E refers to an expectation. For example, $\mathbb{E}_{x \sim P_X}$ may refer to the expectation is taken under the distribution $P_X$. The x in the loss may be sampled from distribution $P_X$.

The basic idea of cycle consistency loss is that for each image x without makeup from domain X, after the image translation cycle: $x \rightarrow G(X)+x+F(R(G(x)+x))$, the image translation cycle should be able to bring x back to the original image, and F and G should satisfy the forward cycle consistency: $x \to G(x) \to x + F(R(G(x)+x)) \approx x$. Similarly, for each image y from domain Y, G and F should also satisfy backward cycle consistency: $y \to F(y) \to G(F(y)) + F(y) \approx y$. In some embodiments, the cycle consistency loss may be represented as a consistency loss function. The loss function may output a value, which may be optimized resulting in the consistency loss function being minimized such that the differences in inputs and outputs of both the forward and backward cycles are minimized. In some embodiments, the loss function is optimized when the value outputted by the consistency loss function exceeds a desired optimization. The optimization may be a threshold value that when exceeded indicates that the outputs differ substantially from the inputs in both the forward and backward cycles.

Compared to the cycle consistency loss present in Cycle-GAN, the cycle consistency loss of the present invention, in one embodiment, is modified as follows:

$$L_C(G, F) = \mathbb{E}_{x \sim P_X}[\|F(R(G(x)+x)) - x\|_1] + \mathbb{E}_{y \sim P_Y}[\|G(F(R(y))) + F(R(y)) - y\|_1]$$

where $R(\cdot)$ is the function to reduce the resolution of an image. In the exemplary embodiment, reducing resolution of the image involves reducing the size of the image and then resizing the image. For example, a bicubic down sample method is applied to the image to down sample the image to half size, thereby generating a low-resolution image. This low-resolution image is then fed into F. Then, the image is resized back to its original size. The generated high-resolution output, from a low-resolution input, is compared with high-resolution input images. The comparison output is used in training F. In some embodiments, the difference between the image generated from the low-resolution input and the target image with high resolution is minimized using cycle consistency loss. In some embodiments, the preferred learned makeup removal generator generates a high-resolution output even with a low-resolution input. Through training, the F is forced to transform the image with low-resolution input to high-resolution, while removing makeup. In this way, F has the ability of super-resolution.

In some embodiments, a sparse loss is added onto the generated makeup region. The addition of the sparse loss is to learn a makeup region that only contains makeup (e.g., lipstick), instead of other regions (e.g., skin, teeth). L1 norm may be the sum of the magnitudes of the vectors and may be added to both the generated makeup $y_{cycle}{}^a = G(x)$ and the reconstructed makeup: $y_{cycle}{}^a = G(F(R(y)))$:

$$L_S(G, F) = \mathbb{E}_{x \sim P_X, y \sim P_Y}[\|G(x)\|_1 + \|G(F(R(y)))\|_1]$$

In some embodiments, changes among frames of a video (e.g., lighting or color changes, changes due to movement of the camera, etc.) cause flickering effects. Pop loss may be used to minimize the differences between two generated makeup removal images by F with the noised input image (adding random noise onto the original input image) and the original input image respectively. Through pop loss, the learned generator F has the ability of denoising which can help reduce the flickering effects among generated frames.

Thus, in order to reduce this flickering effect and achieve the consistency among generated frames, pop loss ($L_P$) may be integrated when calculating the loss function for optimizing the generator F, in some embodiments. In the pop loss function $L_P(F, Y)$, defined below, $F(R(N_2(y)))$ is representative of $x_{fake}{}^{N_2}$ of FIG. 2B and $F(R(y))$ is representative of $x_{fake}$ of FIG. 2B. Using the pop loss function, the differences between generated images with noised inputs $N_2(y)$ and normal inputs y are minimized. $N_2(y)$ is the function to reduce the resolution of an image, which is described previously in cycle consistency loss. The pop loss is defined as follows:

$$L_P(F, Y) = \mathbb{E}_{y \sim P_Y}[\|F(R(N_2(y))) - F(R(y))\|_2].$$

Accounting for pop loss in image transformation is unique in several respects. For example, existing image transformation systems mainly focus on still images, not video-based systems, therefore changes among frames are a concern for the existing image transformation systems. In other systems that involve video, inconsistencies between successive video frames are accounted for through temporal methods (e.g., use of prediction techniques to predict the next frame based on the prior frame), not by using pop loss as described herein. Further, the particular pop loss technique used by the methods of the present invention are unique in that a comparison is made between $x_{fake}{}^{N_2}$ and $x_{fake}$ to determine the difference that is used to optimize the loss function, which ensures that F is optimized using a pop loss function. If noise were added to y directly, and a comparison made between y and $y_{cycle}$, then F would not be trained directly to perform denoising (i.e., as G could be doing at least some of the denoising).

As discussed previously with regard to GAN loss, adversarial training is applied for learning the generator and discriminator simultaneously. The main idea for the discriminator loss is that the discriminator could correctly classify whether an image is a real image from the dataset or a generated image from the generator. A Least Square Generative Adversarial Network (LSGAN) training strategy is employed, which applies a least square error loss for the discriminator:

$$L_D(D_Y, Y, Y_{fake}) = \frac{1}{2}\mathbb{E}_{y \sim P_Y}\|D_Y(N_1(y)) - b\|_2 + \frac{1}{2}\mathbb{E}_{y_{fake} \sim P_{Y_{fake}}}\|D_Y(N_1(y_{fake})) - a\|_2,$$

$$L_D(D_X, X, X_{fake}) = \frac{1}{2}\mathbb{E}_{x \sim P_X}\|D_X(N_1(x)) - b\|_2 + \frac{1}{2}\mathbb{E}_{x_{fake} \sim P_{X_{fake}}}\|D_X(N_1(x_{fake})) - a\|_2.$$

where a and b are the labels for fake data and real data, respectively. $N_1(\cdot)$ is the function to add Guassian noise of an image. In some embodiments, Gaussian noise may be added to prevent the discriminator from being too strong. If the discriminator is too strong, the generator gradient will disappear, and the generator will not have learned anything and thus not be trained to correctly transform the image as desired. In some embodiments, $N_1(\cdot)$ is the function to add Guassian noise of an image.

Figure 3:
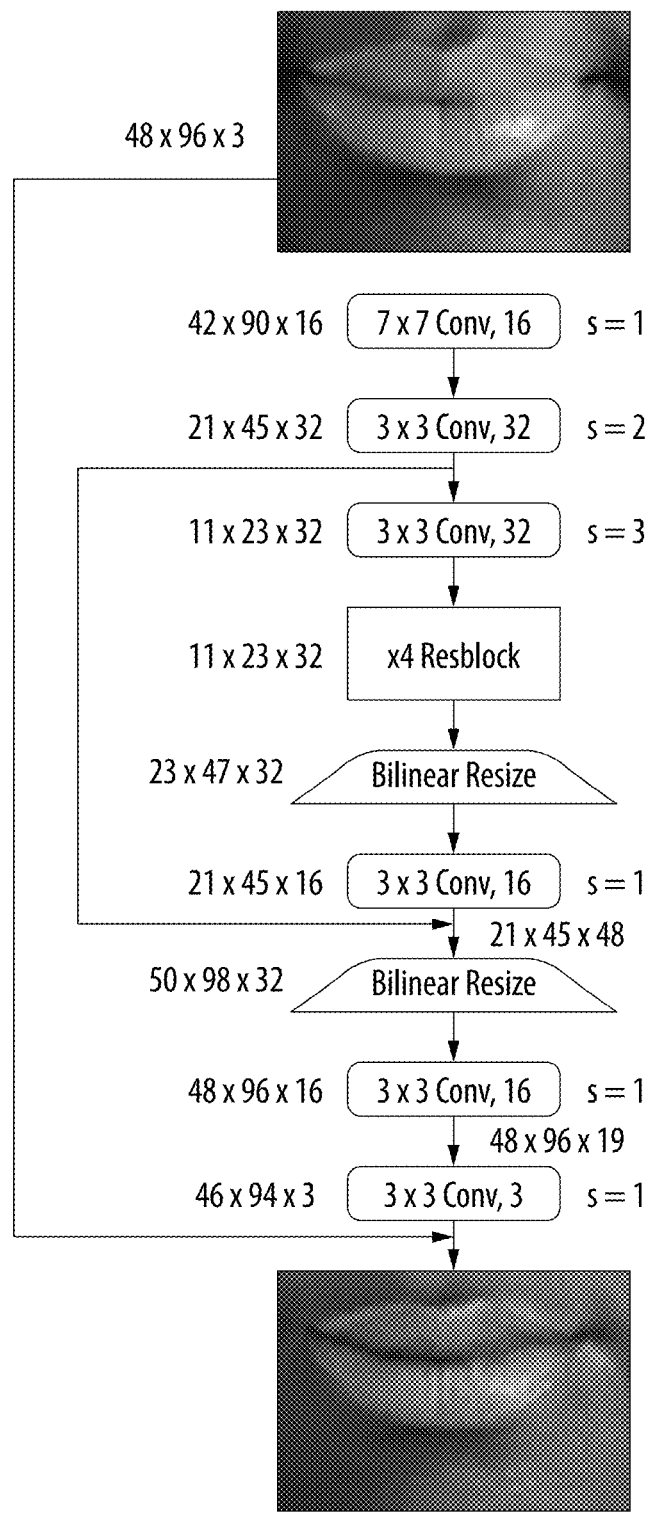
FIG. 3 is a diagram illustrating a representative architecture of a makeup removal generator used in connection with the image transformation system according to one embodiment.
Figure 4:
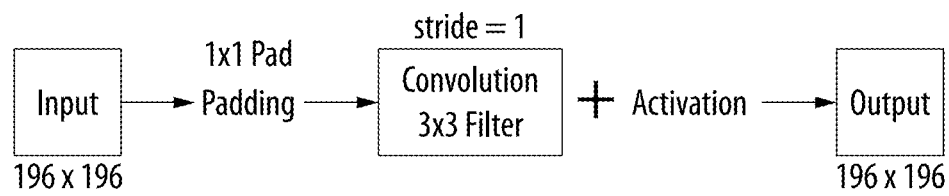
FIG. 4 is a diagram illustrating a representative structure of a conventional convolutional neural network according to one embodiment.
Figure 5:
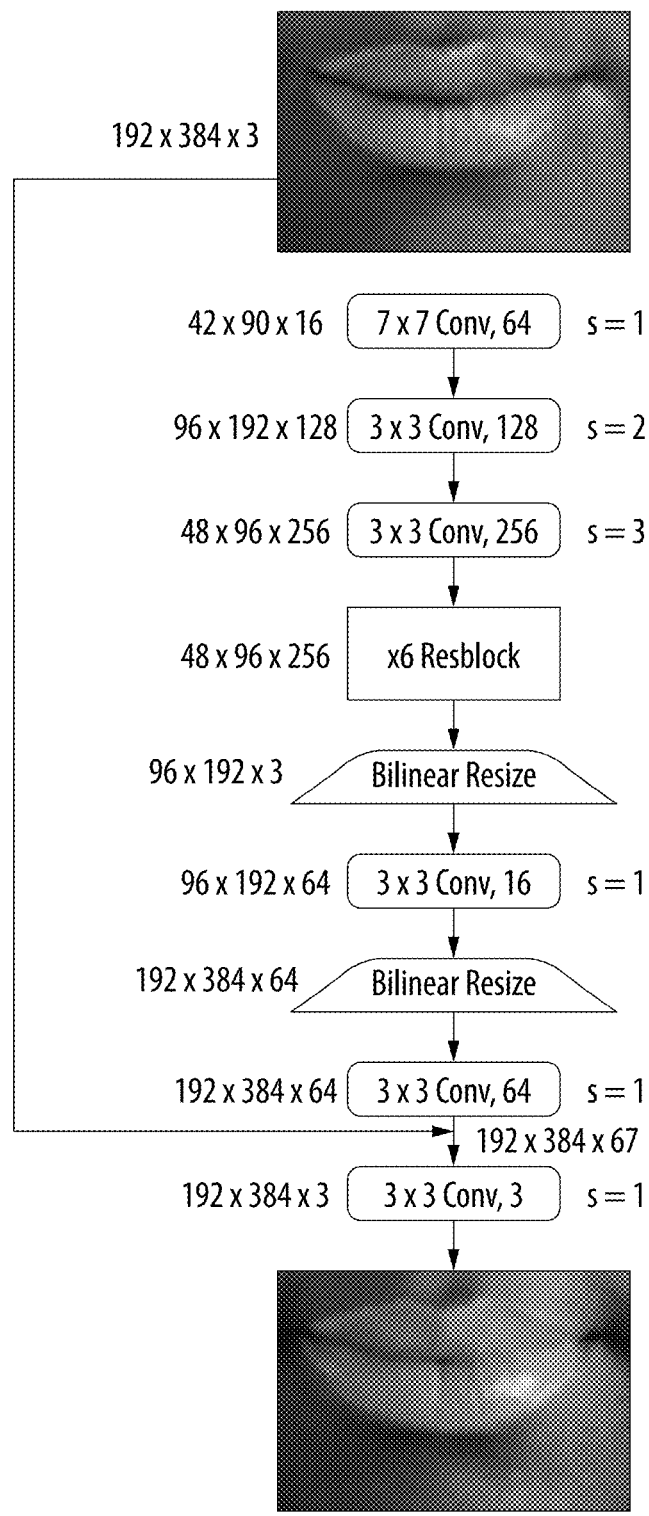
FIG. 5 is a diagram illustrating a representative architecture of a makeup generator used in connection with the image transformation system according to one embodiment.

In some embodiments, a lightweight design is applied to F since the makeup removal generator F is applied in the on-line system. FIG. 3 illustrates an exemplary architecture for the makeup removal generator. The makeup generator G and discriminators $D_x$, $D_y$ are non-lightweight. A lightweight design of F may include a smaller number of filters, res-blocks, and/or filter size, compared with makeup generator G. Meanwhile, the input and output image size of F is smaller (e.g., four times smaller) than G, $D_x$, $D_y$. The lightweight design of F helps the system to achieve the real-time speed and the small model size. However, if all of F, G, $D_x$, $D_y$ were made lightweight, namely "balanced", the generated image quality would be largely decreased. The "unbalanced" design allows for the quality of generated image to not decrease too much.

In some embodiments, Gaussian noise is added to the inputs of discriminators and a smaller weight is set for discriminators, in order to prevent the discriminators from being strong. Due to the unbalanced design, the discriminator could easily to be too strong, which could result in the generator gradient vanishing, and the model ceasing to learn. In some embodiments, the system is configured to remove features from the photograph of the face (e.g., the lip region) while maintaining the overall structure of the face. For example, the makeup removal generator is designed such that it reliably removes lipstick while maintaining lip structure; has as few parameters as possible for a lightweight model; and runs in real-time (e.g., at least 30 frames per second) on common desktop CPUs.

In one exemplary embodiment, the generator F includes multiple convolution layers and a set of 4 res-blocks, as illustrated in FIG. 3. The image is encoded using one 7×7 convolution layer (short of a convolution layer with filter size 7×7) followed by two 3×3 convolution layers of stride 2. This sub samples the image, thereby encoding valuable information which is then fed into 4 res-blocks. As illustrated in FIG. 3, the input is set as a very small size due to allow for speeding up the computation. The network has only 4 res-blocks and reduced feature maps at each layer. The sizes of feature maps are shown in FIG. 3, where s is denoted as the size of stride.

The res-blocks are responsible for taking the encoded information and then transforming it to the desired form. This is then decoded using a series of upsampling layers. For upsampling, a bilinear resize layer is used followed by a 3×3 convolution. This is preferable than using one single transposed convolution layer for several reasons that include: it is about two times faster than using one single transposed convolution layer; and it avoids artifacts (e.g., checkerboard artifact), improving visual quality of the result. This exemplary architecture provides good quality of image generation with very few parameters and consequently good speed of inference on the CPU. The frozen model size on Tensorflow is approximately 2.5 MB.

In some embodiments, the method addresses potential loss of quality and original structure after reconstruction from the latent space, for example in circumstances where the network may forget what the original input looked like. In some embodiments, the method includes increasing the number of parameters so that the network remembers more information from its input. However, this may reduce inference speed. In one embodiment, a potential reduction in inference speed may be achieved through use of the technique used in UNet. UNet creates a skip connection between the input and the output thereby helping the network remember fine grain features from the input. This can help in maintaining lip structure and skin color on the region around the lips.

Preferably, the makeup generator G has many of the same features and innovations from the makeup removal generator as discussed herein. However, less weightage is applied to inference speed as is applied for the makeup removal generator F, in embodiments in which generator G is only applied in offline training stage and not used in the online makeup removal stage. Special efforts to reduce the number of parameters or latency are not made in some examples. Instead, the desire is to maximize quality for generation of fake makeup images. To this end, a few skip connections may be maintained so that the network does not forget the basic structure of the input. This was found to be useful so that the output shape is not disfigured while color is changed appropriately.

Figure 6:
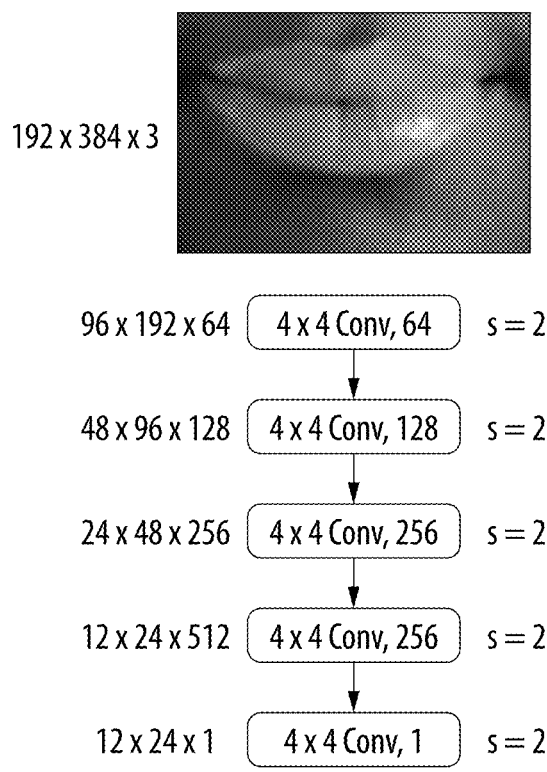
FIG. 6 is a diagram illustrating a representative architecture of a discriminator used in connection with the image transformation system according to one embodiment.

FIG. 6 illustrates an exemplary architecture of the makeup generator. In some embodiments, the make-up generator includes more res-blocks and increased feature maps at every layer compared to the make-up removal generator. This increases computational time, but only in the training stage, and makes the network generate high quality results (e.g., high resolution images).

objective of the discriminator is to differentiate between real and fake images. In some embodiments, two discriminators are used, a first discriminator to distinguish between real makeup images and generated fake makeup images and a second discriminator to distinguish between real images without makeup and generated fake makeup removal images. For this purpose, the output from each discriminator needs to be a value between 0 and 1, where 1 indicates a real sample and 0 indicates a fake sample. For example, the closer the output value of the discriminator is to 1, the higher the probability that the sample is a real sample. In some embodiments, to improve the accuracy of the discriminators, the method of label annealing is used wherein a real label is 0.9 instead of 1.

In some embodiments, the same discriminator architecture may be used to distinguish between real and fake makeup images as well as between real and fake non-makeup images. The discriminator must have enough parameters to encode information about the type of images it sees to classify them accordingly. At the same time, the discriminator cannot be too large to overfit or increase training time by impractical proportions.

In some embodiments, the input into the discriminator is the entire image (e.g., lip image). The image may not be resized to make it smaller as is done in the generator because the discriminator runtime is not as time critical as the generator runtime. In some embodiments, the discriminators are not applied in the online stage, due to the feedforward architecture of the framework.

Figure 7:
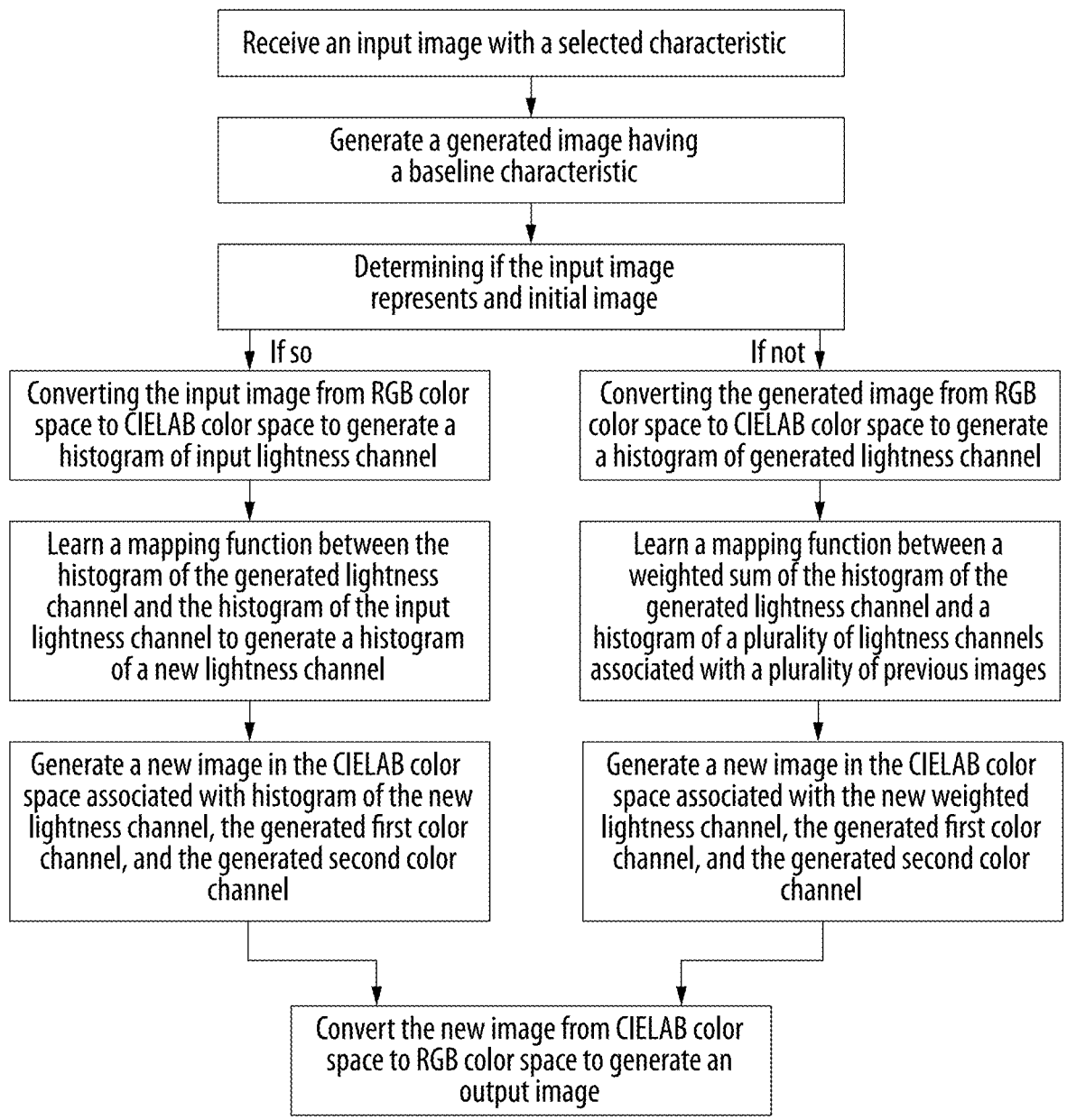
FIG. 7 is a diagram illustrating an exemplary methodology for processing a video according to one embodiment.

As illustrated in FIG. 7, the entire 192×384 image is fed into a series of, for example, 5 convolution layers. However, the image may be any size and the system may include a series of any number of convolutions. In some embodiments, each convolution has a stride of 2 so that the image is sub sampled after each convolution. The result is a 12×24×1 feature map. The output feature map is activated using a hyperbolic tangent function, tanh. This is done so that a value between 0 and 1 is obtained for the output where 0 indicates that it is a fake image and 1 shows that it is a real image. The result is mean square averaged to give one single value instead of a vector.

In some embodiments, the system (e.g., neural network) is trained using images that have the certain feature as well as images that are devoid of the certain feature. For example, the system may be trained with images having makeup as well as images without makeup. The exemplary network architecture described herein allows for applying unpaired images for training (e.g., if the training makeup image is from person A, the no makeup image can be from person B). Adversarial training may be applied for learning the generators and discriminators simultaneously. In some embodiments, for each step, the generators and discriminators are trained alternatively following LSGAN. The training strategy used for training the network of the system may compensate for the lightweight design of the generator architecture. Losses are biased to be higher for the makeup removal generator. In some embodiments, the weight for the GAN loss for the makeup removal generator is set as 25 and for the makeup generator as 20. However, the weight for the GAN loss for the makeup removal generator may be between 15 and 35, and the weight for the makeup generator may be between 10 and 30. In some embodiments, the weight for cycle loss is 20 and sparse loss is 2. However, the weight for the cycle loss may be between 10 and 30 and the spare loss may be between 1 and 5. In some embodiments, an Adam optimizer is used for optimization. The learning rate may be set at 2e-4 and with no decay.

FIG. 7 illustrates the methodology for histogram matching and memory-based histogram matching, which are the post-processing steps of the online makeup removal system. In some embodiments, histogram matching and memory-based histogram matching are only used in on-line/test stage and serve two main purposes. The first purpose is to recover the output resolution and image quality generated by the deep learning model, which is compromised for speed-up and small model size, back to that of the input. The second purpose is to overcome the slight differences among a series of generated frames, such as lighting and color distributions.

In some embodiments, histogram matching is used to map a target distribution to a desired distribution. For example, the exemplary system may map the input lip color distribution to the post-makeup removal lip color distribution using histogram matching. To ensure color consistency between the low-resolution output and the high-resolution histogram matched output, histogram matching is performed on the L channel of CIELab space instead of all three RGB channels. Thus, the L channel of input lip color distribution is mapped to the generated makeup removal lip color distribution in CIELab color space. Then, the histogram matched L channel of the input makeup image is combined with the a, b channel of the makeup removal image to generate a new makeup removal image. The L channel carries the lighting information and the details of the input image. In this way, the information from the input image is borrowed to increase the image quality of the generated makeup removal image, while keeping the color at least substantially unchanged. If the current frame is the first frame of the video, histogram matching is performed using the information of the first frame. If the current frame is not the first frame, a memory-based histogram matching is performed, which calculates both the current frame and all the previous frames.

In some embodiments, histogram matching includes three steps: 1) equalization; 2) inverse mapping; and 3) forward mapping. Equalization aims to normalize an image through a mapping function derived from its own pixel-statistical information. For example, suppose the target probability density distribution of the makeup image is $\rho'''(\cdot)\varepsilon[0,1]$ and the reference distribution of makeup removal image is $\rho'(\cdot)\varepsilon[0,1]$, then the target mapping function $P(\mu)$ and the desired mapping function $Q(\xi)$ are defined as follows:

$P(\mu)=(L-1)\int_0^\mu \rho^m(w)dw,$ $Q(\xi)=(L-1)\int_0^\xi \rho^r(w)dw,$ where $\mu$, $\xi$, $P(\mu)$, $Q(\xi)\varepsilon[0, L-1]$. After the mapping functions are computed for each of the images from the previous step, then the mathematical relations between $\mu$ and $\xi$ can be established through inverse mapping. Assuming both $Q(\cdot)$ and $P(\cdot)$ map to the same range such that $Q(\xi)=P(\mu)$, then $\xi=Q^{-1}(P(\mu))$. The resulting inverse mapping function would be defined as $P'(\cdot)=Q^{-1}P(\cdot)$. In some embodiments, the forward mapping operation transforms each target pixel of the input image with the inverse mapping function. The input image is an 8-bit unsigned integer array ranging from 0-255. Therefore, P' can be treated as a look-up table for each 8-bit value. In some embodiments, each luminance value in the L channel of initial lip color would be mapped to the reference luminance distribution through P'.

In some embodiments, the lip region image without makeup x and with makeup y are converted into CIELab color space, and the L channel $L^r$ (reference) and $L^m$ (target) of the images, respectively, are obtained. Suppose the target probability density distribution (histogram) of $L^m$ is $\rho^m(\cdot)\varepsilon[0,1]$ and the reference distribution of $L^r$ image is $\rho^r(\cdot)\varepsilon[0,1]$, the target histogram equalization function $P(\mu)$ and desired histogram equalization function $Q(\xi)$ are calculated. Then, the inverse mapping function $P'(\cdot)=Q^{-1}P(\cdot)$ is calculated as presented above. Then, a forward mapping is conducted accordingly to transform each of the target pixels in $L^m$ through P' and obtain $L^{m'}$. A weighted sum is applied to get the new L channel of removal image by $L'=0.3\times L^r+0.7\times L^{m'}$. For example, $L^r$ and $L^{m'}$ may be weighted as illustrated by $L'=0.3\times L^r+0.7\times L^{m'}$. Then, the image is converted back to RGB channel.

The pseudo code for this histogram matching process is provided below:

---
Histogram matching in CIELab color space
    input: x, lip region image without makeup in RGB space,
        y, lip region image with makeup in RGB space.
    output: $x^h$, xafter histogram matching,
        $\rho^r$, $\rho^m$, histogram of L channel of x and y in CIELab color space.
    Convert x, y to CIELab color space: $L^r, A^r, B^r$ = LAB(x), $L^m, A^m, B^m$ = LAB(y)
    Get histogram of $L^r$ and $L^m$ as $\rho^r$ and $\rho^m$.
    Conduct histogram equalization function $P(\mu)$ of $\rho^m$ and $Q(\xi)$ of $\rho^r$.
    Calculate inverse mapping function $P'(\bullet) = Q^{-1}P(\bullet)$.
    Conduct forward mapping operation to transform $L^m$ to $L^{m'}$ according to P'.
    Get new L channel of removal image by $L^h = 0.3 \times L^r + 0.7 \times L^{m'}$y.
    Concatenate $L^h$, $A^r$, $B^r$ and convert to RGB space : $x^h$ = RGB($L^h A^r B^r$).

---

In some embodiments, even where histogram matching achieves satisfactory performance for improving image quality for still image, video-based generation systems present additional challenges. More particularly, slight differences among a series of generated frames in the video, such as lighting and color distributions, may occur. In order to address this problem, a memory-based histogram matching algorithm with the use of an exponential filter may be used. In one embodiment, an objective is to smooth out the effect from one single frame by considering the current frame and all the previous frames. This process is illustrated with reference to the makeup removal imager as an example. A memory-based histogram $\rho_t^r$ is calculated from a weighted sum of histogram in current frame $\rho^r$ and the memory-based histogram in previous frame $\rho_{t-1}^r$:

$\rho_t^r=0.1\times\rho^r+0.9\times\rho_{t-1}^r$

The memory-based histogram of the makeup image is calculated in the same way:

$$\rho_t^m = 0.1 \times \rho^m + 0.9 \times \rho_{t-1}^m$$

To avoid a sparse histogram from the low resolution image, a Gaussian Blur may be applied to smooth out the histogram while reducing induced artifacts.

The pseudo code of memory-based histogram matching is provided below:

---

Memory-based histogram matching in CIELab color space
input: x, lip region image without makeup in RGB space,
    y, lip region image with makeup in RGB space,
    $\rho_{t-1}^r, \rho_{t-1}^m$, memory-based histogram of L channel of x and y in CIELab color space in previous frame t− 1.
output: $x^h$, xafter histogram matching
    $\rho_t^r, \rho_t^m$, histogram of L channel of x and y in CIELab space in current frame t.
Convert x, y to CIELab color space: $L^r, A^r, B^r$ = LABG(x), $L^m, A^m, B^m$ = LAB(y).
Get histogram of $L^r$ and $L^m$ and smooth out histogram with Gaussian Blur as $\rho^r, \rho^m$.
Get memory-based histogram from a weight sum of histogram in current frame and memory-based histogram in previous frame:
    $\rho_t^r = 0.1 \times \rho^r + 0.9 \times \rho_{t-1}^r, \quad \rho_t^m = 0.1 \times p^m + 0.9 \times \rho_{t-1}^m$
Conduct histogram equalization function $P(\mu)$ of $\rho_t^m$ and $Q(\xi)$ of $\rho_t^r$.
Calculate inverse mapping function $P'(\bullet) = Q^{-1}P(\bullet)$.
Conduct forward mapping operation to transform $L^m$ to $L^m$ ' according to P'.
Get new L channel image by $L^h = 0.3 \times L^r + 0.7 \times L^m$ '.
Concatenate $L^h, A^r, B^r$ and convert to RGB space : $x^h$ = RGB($L^h A^r B^r$).

---

In some embodiments, Poisson image editing is applied for seamless cloning. Seamless cloning may be used to blend the source image (e.g., lip region image after removal, referred to herein as new image data) with the destination image (e.g., full face image with makeup, referred to herein as the input image data). In some embodiments, the seamless cloning is uses a created mask (inscribed ellipse of lip region image, referred to herein as the isolated image data) and produces more realistic result image (e.g., full face image without makeup, referred to herein as output image data). In some embodiments, seamless cloning minimizes the difference of the gradient between the result image and source image within the masked region, with the constraint that the intensity of the resulting image and destination image on the boundary of the mask are the same and can be accomplished by solving a Poisson equation. In some embodiments, the mask used is the inscribed ellipse of the lip region image, instead of the whole rectangular lip image, because a human's eyes are less sensitive if there are artifacts on the boundary of curves instead of straight lines.

In some embodiments, the system includes an unbalanced neural network. The unbalanced neural network includes a baseline generator that is configured to generate an image having a baseline characteristic. The unbalanced neural network includes a generator configured to generate an image having a selected characteristic. The unbalanced neural network also includes a baseline discriminator associated with the baseline generator and a discriminator associated with the generator. In some embodiment, compared to the generator, the baseline discriminator, and the discriminator, the baseline generator includes one or more of a smaller number of res-blocks, a smaller number of filters, and a smaller filter size. For example, the baseline generator may include a smaller number of res-blocks, a smaller number of filters, and/or a smaller filter size compared to the generator, the baseline discriminator, and the discriminator. In some embodiment, the baseline generator includes up to four res-blocks and the generator includes more than four res-blocks. In some embodiments, the baseline generator is configured to produce a result in real-time and configured to process at least 30 frames per second and can be run on a CPU or a GPU. In some embodiments, the input image received by the baseline generator has a resolution lower than input image received by the generator. In some embodiments, an input image and an output image associated with the baseline generator are at least four times smaller than an input image and an output image associated with each one of the generator, the baseline discriminator, and the discriminator.

Figure 8:
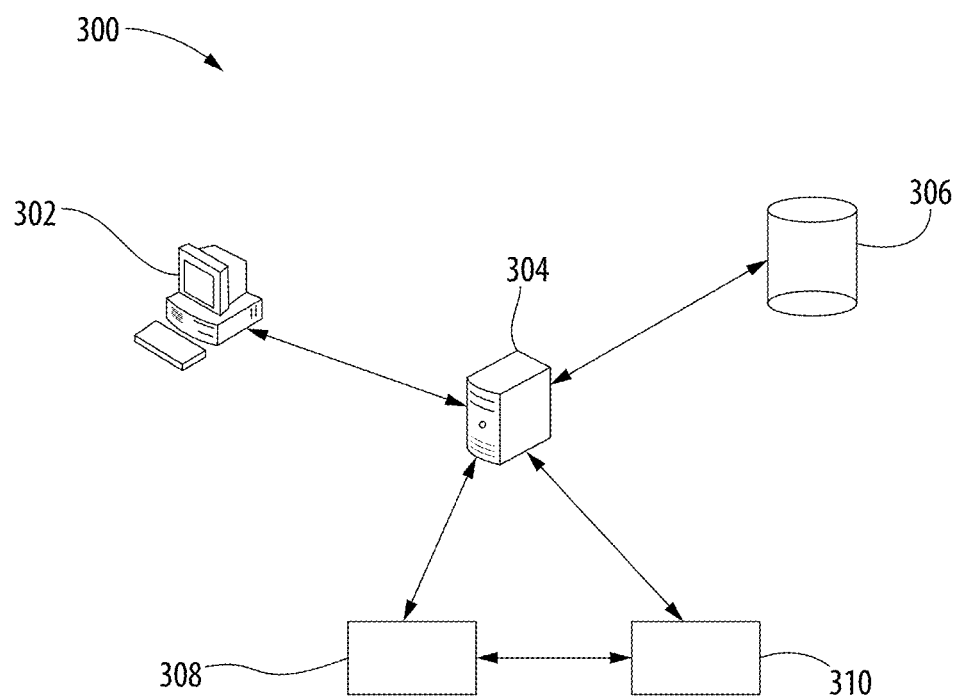
FIG. 8 is a diagram illustrating an exemplary image transformation system according to one embodiment.

FIG. 8 illustrates an exemplary system of the present invention. Referring to FIG. 8, one or more computer systems that may be used to implement the methods of the present invention, which methods may be implemented as programmable code for execution by a computer system, are now described. More particularly, each of the computer systems comprises hardware, as described more fully herein, which is used in connection with executing software/computer programming code (i.e., computer readable instructions) to carry out the steps of the methods described herein. Use of a computer system in accordance with the present invention allows end users to input an image and receive an output image. Computer system 300 may include remote device 302, server 304, database 306, processor 308, and memory 310.

The processor 308 may be any type of processor, including but not limited to a special purpose or a general-purpose digital signal processor, specially programmed to perform the methods described herein. The processor 308 may be connected to or housed within server 304. The processor 308 may be communicatively coupled to remote device 302, database 306, and memory 310.

Computer system 300 may include one or more memories 310. The memory 310 may include at least one of: random access memory (RAM), a hard disk drive and a removable storage drive, such as a floppy disk drive, a magnetic tape drive, or an optical disk drive. The removable storage drive reads from and/or writes to a removable storage unit. The removable storage unit can be a floppy disk, a magnetic tape, an optical disk, which is read by and written to a removable storage drive.

In alternative implementations, the memory 310 may include other similar means for allowing computer programs or other instructions to be loaded into computer system 300. Such means may include, for example, a removable storage unit and an interface. Examples of such means may include a removable memory chip (such as an EPROM, or PROM, or flash memory) and associated socket, and other removable storage units and interfaces which allow software and data to be transferred from removable storage unit to the computer system. Alternatively, the program may be executed and/or the data accessed from the removable storage unit, using processor 308 of computer system 300. For example, memory 310 may include instructions to be executed by processor 308.

Computer system 300 may include one or more remote devices 302. Remote device 302 may include a user interface. The user interface may be a program that controls a display of remote device 302, on which the output of the processes described herein can be displayed. The user interface may include one or more peripheral user interface components, such as a keyboard or a mouse. The end user may use the peripheral user interface components to interact with computer system. The user interface may receive user inputs, such as mouse inputs or keyboard inputs from the mouse or keyboard user interface components. In some embodiment, remote device 302 may be a portable electronic device.

In some embodiment, remote device 302 may be an electronic device having a capturing device capable of capturing a plurality of images, such as a video. Remote device 302 may be communicatively coupled to server 304 and may be configured to transmit the captured plurality of images to server 304. In practice, remote device 302 may capture one or more input images and transmit the one or more input images to server 304.

In some embodiments, remote device 302 may include the lightweight removal generator, sometimes referred to as the baseline generator. The lightweight removal generator may be a generator configured to be lightweight such that it is less than 2.5 MB. Remote device 302 may be a CPU, a mobile device, a laptop, or a tablet.

In some embodiments, the user interface displays data on the display of a computer system using a web browser. A web browser may be an application with the ability to render HTML, pages, Cascading Style Sheets (CSS) and JavaScript content on the display of the user interface. In some embodiments, the user interface displays data, such as web pages, on the display of the client device using another software application. One of ordinary skill in the art will appreciate that the user interface is not limited to displaying data using a web browser or another software application, and that embodiments of the present invention may contemplate using other display devices or software suitable for the purposes of displaying the data.

Computer system 300 may include one or more servers 304. Server 304 may be communicatively coupled to remove device 302 and database 306. In some embodiments, server 304 includes processor 308 and memory 310. For example, processor 308 and memory 310 may be disposed or housed within server 304. In some embodiments, the offline training of the neural network may occur within server 304 and server 304 may include the unbalanced neural network. For example, server 304 may include removal generator, sometimes referred to as baseline generator. In some embodiments, server 304 also includes one or more generators and one or more discriminators. For example, server 304 may include a make-up removal generator, a make-up generator, a discriminator associated with the make-up removal generator, and a discriminator associated with the make-up generator. In some embodiments, the baseline generator, which may be a lightweight generator, is downloaded from server 304 to remote device 302.

Computer system 300 may include one or more databases 306. Databases 306 may be configured to store inputs and outputs of the neural network that is stored within server 304. Database 306 may be communicatively coupled to server 304 and/or remote devices 302.

Thus, in exemplary embodiments, there is included one or more computers having one or more processors and memory (e.g., one or more nonvolatile storage devices). In some embodiments, memory or computer readable storage medium of memory stores programs, modules and data structures, or a subset thereof for a processor to control and run the various systems and methods disclosed herein. In one embodiment, a non-transitory computer readable storage medium having stored thereon computer-executable instructions which, when executed by a processor, perform one or more of the methods disclosed herein.

The foregoing systems and methods provide real-time or near real-time image transformation, including virtually removing makeup from an image of a human in one example, using a deep learning algorithm. Further, the methods decrease processing time while maintaining image quality and implement post processing to further refine results. In a specific exemplary embodiment, a makeup removal tool providing realistic looking results includes approximately 30,000 learnable parameters and a model size of approximately 2.51 MB. In some embodiments, the model of the present invention may be run above 30 FPS for both GPU and CPU devices. The lightweight nature of the model allows for running the model not only on high performance machines, but also edge devices, smartphones and browsers.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method for training a neural network for image transformation, the method comprising:

receiving an input image including a predefined region, the predefined region having a baseline characteristic;

generating, using a generator, a modified image based on the input image, the modified image having a selected characteristic that is different than the baseline characteristic;

reducing a resolution of the modified image to produce a reduced resolution image;

generating, using a baseline generator and based on the reduced resolution image, a generated image having the baseline characteristic;

constructing a loss function based upon a comparison of the generated image and the input image;

optimizing the loss function by applying the loss function to the baseline generator to generate at least one subsequent image if the loss function exceeds a desired optimization;

receiving a second input image including a second predefined region, the second predefined region having the selected characteristic;

generating, using the baseline generator, a second generated image based on the second input image;

generating, using the generator, a second modified image based on the second generated image;

constructing a second loss function based upon a comparison of the second modified image and the second input image:

optimizing the second loss function by applying the second loss function to the baseline generator to generate at least one sub sequent image if the loss function exceeds a desired optimization;

adding noise to the second input image to generate a noise image;

generating, using the baseline generator, a generated noise image based on the noise image, the generated noise image and the second generated image having the baseline characteristic;

constructing a noise function based on a comparison of the generated noise image and the second generated image; and updating the second loss function associated with the baseline generator with the noise function.

2. The method of claim 1, wherein the selected characteristic includes an appearance of make-up and the baseline characteristic includes an appearance without make-up.

3. The method of claim 1, wherein reducing the resolution of the modified image comprises down sampling of the modified image to generate a reduced modified image and resizing of the reduced modified image to a size of the modified image.

4. The method of claim 3, wherein a resolution of the generated image is greater than a resolution of the reduced modified image.

5. The method of claim 1, wherein the input image is a real image and the modified image and the generated image are artificially generated images generated using the neural network.

6. The method of claim 1, further comprising:
determining, using a baseline discriminator associated with the baseline generator, whether the generated image is a real image with the baseline characteristic or an artificial image with the baseline characteristic.

7. The method of claim 1, further comprising:
determining, using a discriminator associated with the generator, whether the modified image is a real image with the selected characteristic or an artificial image with the selected characteristic.

8. The method of claim 1, wherein the generator is a make-up generator and generates an image with make-up.

9. The method of claim 1, wherein the baseline generator is make-up remover and generates an image without make-up.

10. The method of claim 1, wherein the generated image having the baseline characteristic is not identical to the input image having the baseline characteristic.

11. The method of claim 1, wherein modified image does not include the baseline characteristics.

12. The method of claim 1, the loss function is a consistency loss function, a noise function, or combination thereof.

13. The method of claim 1 further comprising:
reducing a resolution of the noise image to produce a reduced noise image.

14. The method of claim 1 further comprising:
reducing a resolution of the noise image to produce a reduced noise image.

15. A system including an unbalanced neural network, the unbalanced neural network comprising:
a baseline generator associated with a baseline characteristic, the baseline generator configured to generate an image having the baseline characteristic;
a generator associated with a selected characteristic, the generator configured to generate an image having the selected characteristic;
a baseline discriminator associated with the baseline generator; and
a discriminator associated with the generator,
wherein compared to the generator, the baseline discriminator, and the discriminator, the baseline generator includes at least one of a smaller number of res-blocks, a smaller number of filters, and a smaller filter size.

16. The system of claim 15, wherein the baseline generator includes up to four res-blocks and the generator includes more than four res-blocks.

17. The system of claim 15, wherein the baseline generator is configured to produce a result in real-time and configured to process at least 3 0 frames per second.

18. The system of claim 15, wherein input image received by the baseline generator has a resolution lower than input image received by the generator.

19. The system of claim 15, wherein an input image and an output image associated with the baseline generator are at least four times smaller than an input image and an output image associated with each one of the generator, the baseline discriminator, and the discriminator.

20. A method for training a neural network for image transformation, the method comprising:
receiving an input image including a predefined region, the predefined region having a selected characteristic;
generating, using a baseline generator, a generated image based on the input image;
adding noise to the input image to generate a noise image;
generating, using the baseline generator, a generated noise image based on the noise image, the generated noise image and the generated image having a baseline characteristic, wherein the baseline characteristic is different than the selected characteristic;
constructing a noise function based on a comparison of the generated noise image and the generated image;
updating a loss function associated with the baseline generator with the noise function; and
optimizing the loss function associated with the baseline generator by applying the loss function to the baseline generator to generate at least one subsequent generated image if the loss function exceeds a desired optimization.

21. The method of claim 20, wherein adding noise includes adding noise to one or more pixels of the input image.

22. The method of claim 20, wherein the selected characteristic is an appearance of make-up and the baseline characteristic is an appearance without make-up.

23. A method for processing a video, the method comprising:
receiving an input image with a selected characteristic, wherein the input image is selected from a plurality of images forming a video;
generating, using a baseline generator and based on the input image, a generated image having a baseline characteristic different than the selected characteristic, wherein the input image and the generated image are in an RGB color space
converting the input image from the RGB color space to a CIELAB color space to generate a histogram of an input lightness channel associated with the input image in the CIELAB color space;
converting the generated image from the RGB color space to the CIELAB color space to generate a histogram of a generated lightness channel associated with the generated image in the CIELAB color space, a generated first color channel, and a generated second color channel;
determining if the input image represents an initial image of the plurality of images:
if the input image represents the initial image of the plurality of images, learn a mapping function between the histogram of the generated lightness channel and the histogram of the input lightness channel to generate a histogram of a new lightness channel, and generating, based on the mapping function, a new image in the CIELAB color space associated with histogram of the new lightness channel, the generated first color channel, and the generated second color channel, wherein the new image has the baseline characteristic;

if the input image does not represent the initial image of the plurality of images, then learn a mapping function between a weighted sum of the histogram of the generated lightness channel and a histogram of a plurality of lightness channels associated with a plurality of previous images, which is an image subset of the plurality of images in the CIELAB color space occurring before the input image, to generate a weighted histogram of a new weighted lightness channel, and generating, based on the mapping function, a new image in the CIELAB color space associated with the new weighted lightness channel, the generated first color channel, and the generated second color channel, wherein the new image has the baseline characteristic;

converting the new image from CIELAB color space to RGB color space to generate an output image.

* * * * *